US007693816B2

(12) United States Patent
Nemoto et al.

(10) Patent No.: US 7,693,816 B2
(45) Date of Patent: Apr. 6, 2010

(54) COMPUTER SYSTEM, COMPUTER, DATA ACCESS METHOD AND DATABASE SYSTEM

(75) Inventors: Kaokazu Nemoto, Yokohama (JP);
Norifumi Nishikawa, Noda (JP);
Kazuhiko Mogi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 11/048,290

(22) Filed: Jan. 31, 2005

(65) Prior Publication Data

US 2006/0106759 A1  May 18, 2006

(30) Foreign Application Priority Data

Nov. 1, 2004 (JP) .................... P2004-318471

(51) Int. Cl.
 *G06F 7/00* (2006.01)
 *G06F 17/00* (2006.01)
(52) U.S. Cl. .......................... 707/2; 711/100
(58) Field of Classification Search ........... 711/100
 See application file for complete search history.

(56) References Cited

U.S. PATENT DOCUMENTS

| 5,237,661 | A  |   | 8/1993  | Kawamura et al. |        |
|-----------|----|---|---------|-----------------|--------|
| 5,261,065 | A  | * | 11/1993 | Urabe et al.    | 707/1  |
| 5,561,763 | A  | * | 10/1996 | Eto et al.      | 714/35 |
| 5,903,887 | A  | * | 5/1999  | Kleewein et al. | 707/2  |
| 5,930,823 | A  |   | 7/1999  | Ito et al.      |        |
| 6,385,604 | B1 | * | 5/2002  | Bakalash et al. | 707/3  |
| 6,493,810 | B1 | * | 12/2002 | Pang et al.     | 711/170|
| 6,728,840 | B1 | * | 4/2004  | Shatil et al.   | 711/137|
| 6,996,680 | B2 |   | 2/2006  | Mogi et al.     |        |
| 7,277,991 | B2 | * | 10/2007 | Day et al.      | 711/137|
| 2002/0032671 | A1 | * | 3/2002 | Iinuma        | 707/1  |
| 2003/0005252 | A1 | * | 1/2003 | Wilson et al. | 711/167|
| 2003/0167272 | A1 | * | 9/2003 | Sinnott, Jr.  | 707/100|
| 2004/0093332 | A1 | * | 5/2004 | Hrle          | 707/3  |
| 2005/0203885 | A1 | * | 9/2005 | Chenevich et al.| 707/3 |

FOREIGN PATENT DOCUMENTS

| JP | 03-073036 A    | 3/1991 |
| JP | 10-083257 A    | 3/1998 |
| JP | 2001-155018 A  | 6/2001 |
| JP | 2003-150418 A  | 5/2003 |
| JP | 2003-150419 A  | 5/2003 |

(Continued)

*Primary Examiner*—Khanh B Pham
*Assistant Examiner*—Azam Cheema
(74) *Attorney, Agent, or Firm*—Townsend and Townsend and Crew LLP

(57) ABSTRACT

There is a program for transmitting a prefetch command to a database management system (DBMS) so that access data of the DBMS can be prefetched to a storage. The DBMS is able to generate an access plan conscious of prefetch and to access database (DB). The DBMS is, however, unable to recognize that a prefetch command program is halted and it cannot generate an access plan at a proper I/O cost. Database management system servers 1, 2, . . . monitor a prefetch program of a management server 5, understands that the prefetch program is halted and it can optimize an execution plan to access storage apparatus 3, 4, . . . by using an I/O cost changed when the prefetch program is halted.

7 Claims, 12 Drawing Sheets

FOREIGN PATENT DOCUMENTS

| | | |
|---|---|---|
| JP | 2003-337722 A | 11/2003 |
| JP | 2004-192292 A | 7/2004 |
| JP | 2004-295458 A | 10/2004 |
| JP | 2004-295790 A | 10/2004 |
| JP | 2005-258735 A | 9/2005 |
| JP | 2005-285058 A | 10/2005 |
| JP | 2006-127418 A | 5/2006 |

* cited by examiner

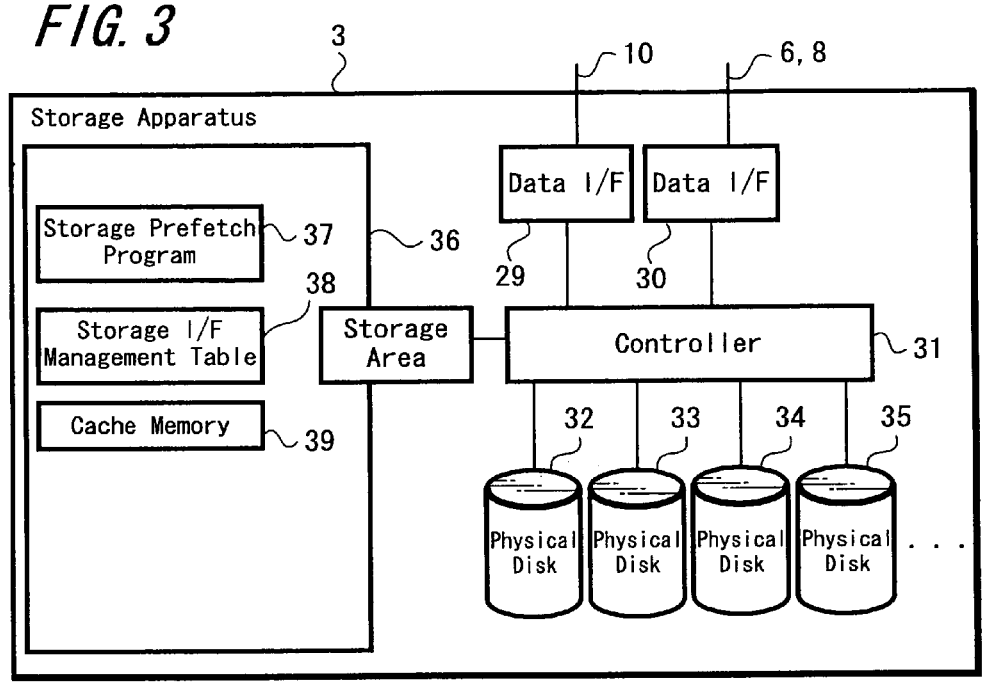
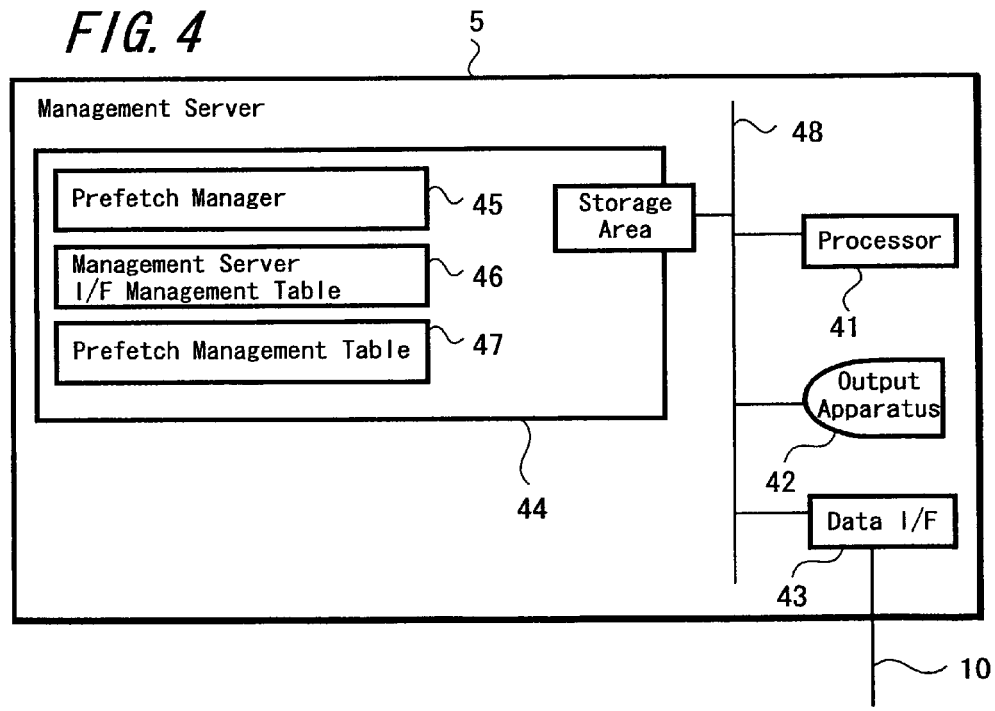

FIG. 5A

| DB-I/F | Name |
|---|---|
| DB-E1 | DBE1 |
| DB-F1 | DBF1 |

FIG. 5B

| Schema ID | Schema Name | Schema Type | Data Area ID | Schema Size | Header Offset Address |
|---|---|---|---|---|---|
| 0 | T1 | TABLE | 0 | 100MB | 128 |
| 1 | T2 | TABLE | 0 | 100MB | 410000 |
| 2 | I1 | INDEX | 1 | 50MB | 128 |

FIG. 5C

| Data Area ID | Area Name | DB File System Name | Area Size |
|---|---|---|---|
| 0 | DB1 | /DB1 | 1GB |
| 1 | DB2 | /DB2 | 1GB |

FIG. 5D

| DB File System Name | Logical Unit Number | Storage Address |
|---|---|---|
| /DB1 | 0 | STA |
| /DB2 | 1 | STA |

FIG. 6A

| Storage Address (71) | Logical Unit Number (72) | Current Value I/O Cost (73) | | Cache I/O Cost (74) | | Disk I/O Cost (75) | |
|---|---|---|---|---|---|---|---|
| | | Sequential (76) | Random (77) | Sequential (78) | Random (79) | Sequential (80) | Random (81) |
| STA | 0 | 5000 | 20000 | 4000 | 4000 | 5000 | 20000 |
| STA | 1 | 5000 | 20000 | 4000 | 4000 | 5000 | 20000 |

| Management Server Address (83) | Prefetch Manager State (84) |
|---|---|
| M1 | ALIVE |

| M-I/F (91) | Name (92) |
|---|---|
| M-E1 | ME1 |

| Storage Address (94) | Logical Unit Number (95) | Logical Block Address (96) | Data Size (97) | State (98) |
|---|---|---|---|---|
| STA | 0 | 128 | 8KB | Prefetched |

FIG. 8

| S-I/F | Name |
|---|---|
| S-E1 | SE1 |
| S-F1 | SF1 |

| DBMS ID | Query ID | Scan TYpe | Storage Address | Logical Unit Number | Header Logical Block Address | Data Size |
|---|---|---|---|---|---|---|
| 5 | 100 | Table Scan | STA | 0 | 128 | 8KB |

| Storage Address | Logical Unit Number | Logical Block Address | Data Size |
|---|---|---|---|

119, 120, 121, 122

```
SELECT *
FROM T1 T2
WHERE T1.1=T2.1
```
~130

160

| Response Time (Delay) | Response Time (Recovery) | Delay Cost | |
|---|---|---|---|
| | | Sequential | Random |
| 100 | 50 | 10000 | 40000 |

171  172  173  170
174  175

COMPUTER SYSTEM, COMPUTER, DATA ACCESS METHOD AND DATABASE SYSTEM

BACKROUND OF THE INVENTION

1. Field of the Invention

The present invention relates generally to a storage system for use with a computer system, and particularly to a storage system for use with a database (DB) (this storage system will hereinafter be simply referred to as a "DB system").

2. Description of the Related Art

At present, a database management system (hereinafter simply referred to as a "DBMS") for managing database (DB) in which an enormous amount of data is stored and which collects data from the DB becomes important for the systems such as enterprises. It has been customary that this DBMS is connected to an operating computer (hereinafter referred to as a "server") and a storage system so that DB data are stored in the storage system. The DBMS is requested to improve performance such as processing speed in order to handle an enormous amount of data.

It is customary that the DBMS receives a query from a client, the DBMS performs optimizing processing to select most-efficient execution plan to execute the query and that it accesses the DB. There are known two kinds of optimizing systems called "rule base optimizing system" and "cost base optimizing system". The rule base optimizing system is a system to determine an execution plan based upon a method of describing a client query code (for example, SQL statement (structured query language statement)). Also, the cost base optimizing system is a system for determining an execution plan based upon information such as a CPU (central processing unit) speed (CPU cost) of a server in which the DBMS is operated. The cost is a value which results from converting processing speed of each unit by parameters. The rule base optimizing system requires the client side to have a large amount of knowledge, and therefore the DBMS generally uses the cost base optimizing system.

For example, in a cost base optimizing system in which hardware costs (CPU cost, I/O speed (I/O cost), a network speed (network cost)) are included in the parameters of the cost base optimizing system of the DBMS, the DBMS considering hardware performance, there is disclosed a technology which can output a more suitable execution plan (see cited patent reference 1).

Also, the storage apparatus can increase processing speed of write request and read request issued from a server connected to it as follows. The storage apparatus includes a volatile memory medium (for example, a semiconductor memory, etc., and it will hereinafter be referred to as a "cache memory") for storing data temporarily in addition to a nonvolatile memory medium (for example, a hard disk, etc., and it will hereinafter be referred to as a "disk device") for storing data. When receiving a data read (or write) request from the server, if the requested data is stored in the cache memory, the storage apparatus ends the processing at the time in which it reads out data from the cache memory (or writes data in the cache memory), and answers the server that the processing is ended.

In general, the cache memory has no mechanical portion such as a seek mechanism and hence it is higher in read speed and the like as compared with the disk device. Accordingly, the storage apparatus can increase speed of response processing to the server by omitting the processing to the disk system. As described above, although the storage apparatus has mounted thereon the technology for prefetching data from the cache memory during the storage apparatus itself carries out sequential access (access for continuous data), this technology is not effective in prefetching data when discontinuous data is accessed.

In association therewith, as a prefetching technology, for example, there has been proposed a technology for issuing a command such that data accessed from the server to the storage system is stored in the cache memory from the disk device (see cited patent reference 2).

[Cited patent reference 1]: Official gazette of Japanese laid-open patent application: No. 2001-155018

[Cited patent reference 2]: Official gazette of Japanese laid-open patent application No. 2003-337722

In the above-mentioned prefetching technology according to the related art, there is provided the management server (management program). When the server accesses the storage apparatus, the management server (management program) issues a command such that data, which will be accessed in the future, is stored in the cache memory from the disk device of the storage apparatus. Therefore, when the DBMS is operated on the server and the DBMS accesses the DB stored in the storage apparatus in response to the command from the management server (management program), the following problems arise. That is, a large difference is produced in the I/O cost corresponding to the input/output processing speed of the server in which the DBMS is operated when the cache memory of the storage apparatus is operated with or without data that should be accessed by the DBMS.

When the management program is halted due to reasons such as fault, the management program becomes unable to issue the data prefetch command to the storage apparatus. However, the DBMS is unable to recognize the fact that the management program is halted. For this reason, since the management program is halted, the DBMS becomes unable to determine whether or not data, which will be accessed by the DBMS, is stored in the cache memory of the storage apparatus. Accordingly, since the DBMS can recognize only the I/O cost of predetermined fixed information, there is a disadvantage that the DBMS generates an access plan at an unsuitable I/O cost.

In this case, during the management program is being operated, the DBMS should execute the prefetch sequence to prefetch data from the storage apparatus to the cache memory through the management program. During the management program is halted, the DBMS should execute the ordinary sequence to directly read out data from the storage apparatus.

SUMMARY OF THE INVENTION

In view of the aforesaid aspect, it is an object of the present invention to provide a computer system, a computer, a database access method and a database system in which state information of a management program is fed back to a database management system (DBMS) and the database management system changes a cost of access operation relative to the storage apparatus based upon this state information of the management program so that the database management system can properly access the database (DB).

In order to solve the above-mentioned problem and to attain the object of the present invention, according to the present invention, when an access plan to database is received from the database management system and a program for transmitting the prefetch command to the storage apparatus is halted due to any cause, the database management system receives a change command of I/O cost and changes the access plan.

Further, the program for transmitting the prefetch command to the storage apparatus understand the situation of the storage apparatus based upon a response time from the start of the prefetch to the end of prefetch and a command of change of the I/O cost is transmitted to the database management system.

According to an aspect of the present invention, there is provided a computer system for accessing database after having carried out optimizing processing based upon a database management program in response to a request from a client. This computer system is comprised of one or a plurality of first computer in which the database management program is operated, one or a plurality of second computer in which a prefetch program for commanding prefetch of data stored in the database management program is operated, a control unit having a cache memory for prefetching the data, one or a plurality of physical disk devices for storing database operated by the database management program and one or a plurality of storage systems connected to the first computer and second computer, wherein the first computer includes a prefetch plan creating unit for creating an execution plan to allow confirmation information to confirm that the first and second computers are operated normally is transmitted and received between the first and second computers and the database management program accesses the database and a prefetch plan change unit for changing an execution plan to allow the first computer to determine that the second computer is halted if the second computer is halted and in which the database management program accesses the database.

According to other aspect of the present invention, there is provided a which is comprised of an interface unit connected to a storage system so as to communicate with the storage system, the storage system including one or a plurality of first computer in which a database management program for accessing database after having carried out optimizing processing in response to a request from a client is operated, a second computer in which a prefetch program for commanding prefetch of data stored in the database based upon information to access the database is operated, a control unit having a cache memory to prefetch the data and one or a plurality of physical disk devices for storing database operated by the database management program, a prefetch plan transmitting unit for receiving activation information transmitted after the prefetch program of the computer was activated, obtaining an execution plan to allow the database management program to access the database stored in the storage system and transmitting the execution plan to the second computer, a prefetch plan creating unit for creating the execution plan to allow the database management program to access the database by transmitting and receiving confirmation information for confirming whether or not the second computer is operated normally between it and the seconds computer and a prefetch plan changing unit for understanding based upon the confirmation information that the second computer is halted and changing the execution plan to allow the database management program to access the database.

According to a further aspect of the present invention, there is provided a database access method for accessing database by executing optimizing processing based upon a database program in response to a request from a client. This database access method is comprised of the steps of operating the database management program in one or a plurality of computer, operating a prefetch program for commanding prefetch of data stored in the database in one or a plurality of second computer when the database management program is operated in the one or the plurality of computer, receiving by the first computer activation information in which the activation information of the prefetch program is transmitted to the first computer after the prefetch program of the second computer was activated, transmitting an execution plan to allow the database management program to access the database to the second computer, transmitting a fetch command from one or a plurality of physical disk devices for storing database operated by the database management program to a cache memory in one or a plurality of storage systems connected to the first and second computers; transmitting and receiving confirmation information between the first computer and the second computer in order to confirm that the first and second computers are operated normally and understanding that the second computer is halted if the second computer is halted and changing an execution plan in which the database management program accesses the database.

In accordance with yet a further aspect of the present invention, there is provided a database system for accessing database by executing optimizing processing based upon a database management program in response to a request from a client, including a server in which the database management program is operated, a storage for storing therein database operated by the database management program, a prefetch program provided on paths of the server and the storage or a path between the server and the storage to transmit a prefetch command of data stored in the database. This database system is comprised of a prefetch plan transmitting unit for receiving activation information to transmit the activation information of the prefetch program to the database management program after the prefetch program was activated and transmitting an execution plan to allow the database management program to access the database to the prefetch program, a prefetch commanding unit for commanding the prefetch program to prefetch data from one or a plurality of physical disk devices to a cache memory in the storage based upon the database management program, a prefetch plan creating unit for creating an execution plan to allow the database management program to access the data by transmitting and receiving confirmation information between the database management program and the prefetch program in order to confirm that the database management program and the prefetch program are operated normally and a prefetch plan changing unit for changing an execution plan to allow the database management program to access the database when the database management program understands that the prefetch program is halted if the prefetch program is halted.

According to the present invention, since it can be determined by the DBMS whether or not data accessed by the DBMS is registered on the cache memory of the storage apparatus, the DBMS can generate the access plan at the proper I/O cost.

BRIEF DESCRIPTION OF THE DRAWINGS

FIG. 3 is a schematic diagram showing an example of an arrangement of a storage apparatus;

FIG. 4 is a schematic diagram showing an example of an arrangement of a management server;

FIGS. 5A to 5D are schematic diagrams showing examples of arrangements of various kinds of tables included in the DBMS server, respectively;

FIGS. 6A and 6B are schematic diagrams showing examples of arrangements of various kinds of tables included in the DBMS server, respectively:

FIGS. 7A and 7B are schematic diagrams showing examples of arrangement of various kinds of tables included in the management server, respectively;

FIG. 8 is a schematic diagram showing an example of an arrangement of a table included in the storage apparatus;

FIGS. 9A and 9B are schematic diagrams showing examples of arrangements of data transmitted and received between the DBMS and the management server and between the management server and the storage apparatus, respectively;

DESCRIPTION OF THE PREFERRED EMBODIMENTS

The present invention will now be described in detail with reference to the accompanying drawings.

In the embodiments of the present invention, let us describe the case in which, when a prefetch manager of a management server is halted due to any cause, a plan creation manager of a DBMS server understands that the prefetch manager of the management server was halted, a DBMS executes a query processing from a client program to calculate a cost by using a proper I/O cost and decides an execution plan.

Figure 1:
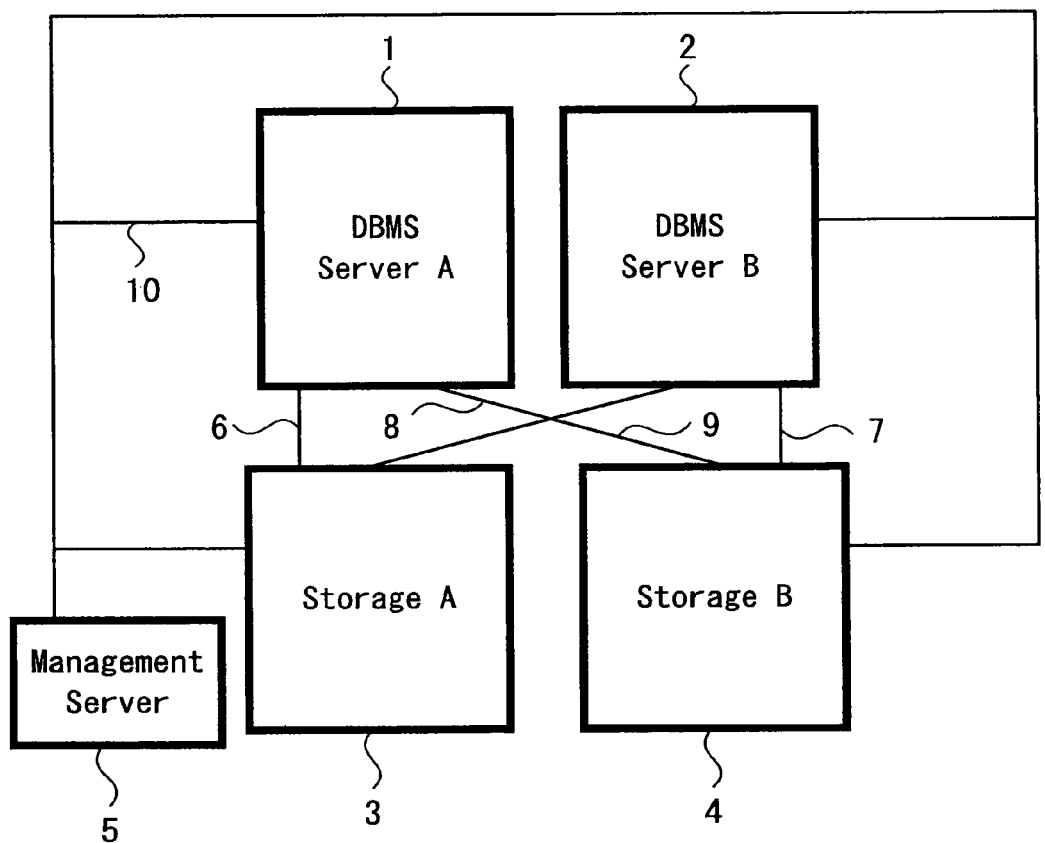
FIG. 1 is a schematic diagram showing an example of an arrangement of a computer system.

FIG. 1 is a schematic diagram showing an example of a system arrangement of a computer system according to an embodiment of the present invention.

As shown in FIG. 1, a computer system according to this embodiment includes a plurality of servers 1, 2, . . . , a plurality of storage apparatus 3, 4, . . . , and a single management server 5 and a network 10 for connecting a plurality of servers 1, 2, . . . , a plurality of storage apparatus 3, 4, . . . , and the single management server 5 and networks 6, 7, 8, 9, . . . , for connecting a plurality of servers 1, 2, . . . and a plurality of storage apparatus 3, 4, . . . with each other.

Also, networks are not limited to the networks 10, 6, 7, 8, 9, . . . and network devices for connecting a plurality of servers 1, 2, . . . , a plurality of storage apparatus 3, 4, . . . and a plurality of servers 1, 2, . . . , a plurality of storage apparatus 3, 4, . . . and the single management server 5 with each other may be used. Routers and the like may be used as specific examples of the network devices. Physical cables such as a local area network (hereinafter simply referred to as a "LAN") and a fiber channel may be used as the specific example of the network shown in FIG. 1.

In this embodiment, the servers 1, 2, . . . execute a program called DBMS (database management system). The servers that execute the DBMS will hereinafter be referred to as "DBMS servers". The DBMS is the program such as updating the contents of DB (database) stored in the storage apparatus 3, 4, . . . , retrieval, creation of table and definition, executed by the server to control the database.

The servers are not limited to the above-mentioned DBMS servers 1, 2, . . . and a computer which becomes a client having access function to access the DBMS may become accessible from the outside, although not shown in FIG. 1.

Figure 2:
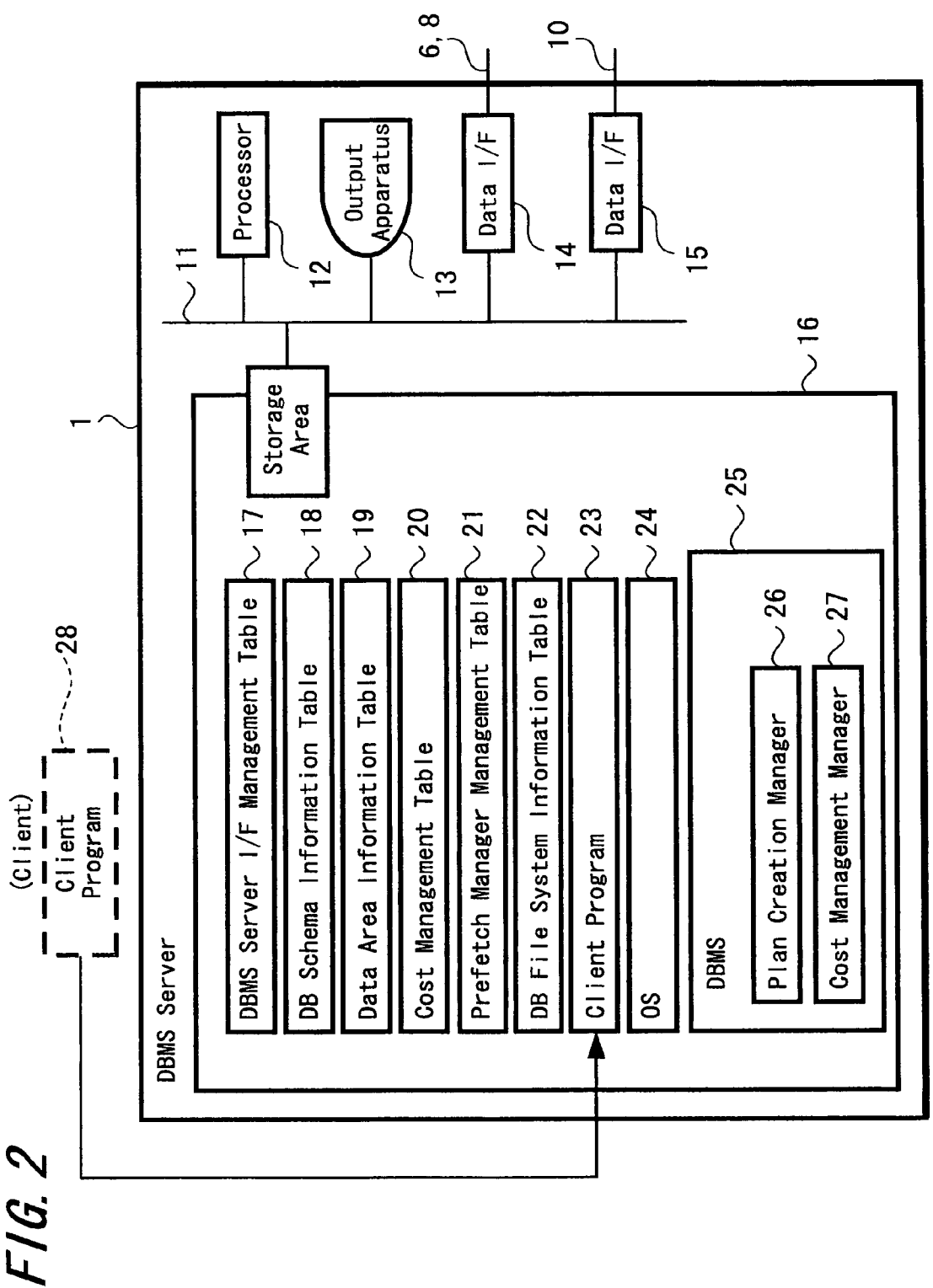
FIG. 2 is a schematic diagram showing an example of an arrangement of a DBMS (database management system) server.

FIG. 2 is a schematic diagram showing an example of an arrangement of the DBMS servers 1, 2, . . . .

As shown in FIG. 2, the DBMS server 1 includes more than one interface 15 (hereinafter referred to as an "Ether I/F") for connecting a processor 12, a storage area 16, a management server 5 and clients which are other apparatus including the storage apparatus 3, 4, . . . , more than one interface 14 (hereinafter referred to as an "FC I/F") for connecting the storage apparatus 3, 4, . . . and an output apparatus 13 for outputting executed results of various kinds of programs executed by the processor 12 of the DBMS server 1. These apparatus are connected with each other through a communication line 11 such as an internal bus. The number of the respective elements and parts are not limited to the above ones and may be changed freely. The above-mentioned client includes a client program to execute an access request.

The storage area 16 stores therein an operating system (hereinafter simply referred to as an "OS") 24, a DBMS 25, a client program 23 which is a program to access the DBMS 25, a DBMS server I/F management table 17, a DB file system information table 22, a DB schema information table 18, a prefetch manager management table 21, a data area information table 19 and a cost management table 20. The DBMS 25 includes a plan creation manager 26 and a cost management manager 27. The processor 12 reads out a program from the storage area 16 and executes the thus read out program. The storage area 16 has stored therein other application programs (not shown) executed by the processor 12. The client program 23 is not limited to the inside of the DBMS servers 1, 2, . . . , but may be based upon the client program 28 from the client outside the DBMS servers 1, 2, . . . and the like.

The DBMS server I/F management table 17 is a table used when the DBMS server 1 controls the Ether I/F interface 15 and the FC I/F interface 14. The DB schema information table 18 has registered thereon setting information concerning the schema such as tables and indexes managed by the DBMS 25. The data area information table 19 has registered thereon setting information concerning data area information managed by the OS 24. Also, the cost management table 20 has registered therein setting information concerning cost information such as the I/O cost. The plan creation manager 26 calculates the query cost in order to optimize the query from the client program 23. When the plan creation manager 26 calculates the query cost, the plan creation manager 26 looks up the cost management table 20 in which the cost information such as the I/O cost is stored. The cost management manager 27 receives information from the management server 5 and updates the setting information of the cost management table 20.

FIG. 3 is a schematic diagram showing an example of an arrangement of the storage apparatus 3, 4, . . . . As shown in FIG. 3, the storage apparatus 3 includes a controller 31 for controlling the inside of the storage apparatus 3, a storage area 36, an I/F 29 (Ether I/F) connected to other apparatus including the DBMS servers 1, 2, . . . an I/F 30 (FC I/F) connected to the DBMS servers 1, 2, . . . and more than one physical disk devices 32, 33, 34, 35, . . . . These apparatus are connected with each other through the controller 31.

The storage area 36 is a nonvolatile memory apparatus. The storage area 36 has an area available as a cache memory 39 and areas in which other information is stored. A storage I/F management table 38 and a storage prefetch program 37 are stored in the area in which other information is stored.

The storage I/F management table 38 is a table used when the controller 31 controls the I/F 29 of the Ether I/F and the I/F 30 of the FC I/F. The storage prefetch program 37 is a program used to store data stored in the physical disk devices 32, 33, 34 and 35 in the cache memory 39 in response to the request from the management server 5.

The number of the I/F 29 of the Ether I/F and the I/F 30 of the FC I/F and the physical disk devices 32, 33, 34 and 35 that the storage apparatus 3, 4, . . . have may be changed freely so long as it may be more than one.

FIG. 4 is a schematic diagram showing an example of an arrangement of the management server 5. As shown in FIG. 4, the management server 5 is a terminal for analyzing access information from the DBMS server 25 and which transmits a prefetch command to the storage apparatus 3, 4, . . . . As shown in FIG. 4, the management server 5 includes a processor 41, a storage area 44, more than one I/F 43 (Ether I/F) for connecting the DBMS servers 1, 2, . . . and the storage apparatus 3, 4 . . . and an output apparatus 42 used by the system administrator to operate the system. These apparatus are connected with each other through a communication line 48 such as an internal bus.

The storage area 44 has stored therein a prefetch manager 45 to analyze access information of the DBMS servers 1, 2, . . . and which transmits the prefetch command to the storage apparatus 3, 4, . . . , a prefetch management table 47 for managing the prefetch state and a management server I/F management table 46.

As another embodiment, the management server 5 may be comprised of the same computer as the DBMS servers 1, 2, . . . . In this case, the above-mentioned prefetch manager 45 may be included in the DBMS servers 1, 2, . . . .

FIG. 5A is a schematic diagram showing an example of a DBMS server I/F management table 50 (corresponding to the DBMS server I/F management table 17 shown in FIG. 2) included in the DBMS servers 1, 2, . . . . As shown in FIG. 5A, the DBMS server I/F management table 50 includes records corresponding to the number of the storage apparatus 3, 4, . . . used by the DBMS servers 1, 2, . . . and records corresponding to the number of the management server 5 with which the DBMS servers 1, 2, . . . may communicate with. Each record includes the storage apparatus 3, 4, . . . corresponding to the records and a connection I/F identifier to the management server 5, to be more specific, a DB-I/F column 51 in which information of the port ID of the connection I/F included in the DBMS servers 1, 2, . . . is registered and a name column 52 in which information of the name assigned to the connection I/F identifier registered on the DB-I/F column 51 is registered.

FIG. 5B is a schematic diagram showing an example of a DB schema information table 53 (corresponding to the DB schema information table 18 shown in FIG. 2) included in the DBMS servers 1, 2, . . . . The schema information table 53 is information concerning the DB schema managed by the DBMS 25. As shown in FIG. 5B, each record of the DB schema information table 53 includes a schema ID column 54 in which an identifier used by the DBMS 25 to identify the DB schema is registered, a schema name column 55 in which the name of the DB schema is registered, a schema type column 56 in which the type of the DB schema is registered, a data area ID column 57 in which an identifier of the data area to preserve the DB schema is registered, a schema size column 58 in which the data size of the DB schema is registered and a header offset address column 59 in which the header offset address of the data area to preserve the DB schema is registered.

FIG. 5C is a schematic diagram showing an example of a data area information table 60 (corresponding to the data area information table 19 shown in FIG. 2) included in the DBMS servers 1, 2, . . . . The data area information table 60 is setting information of the data area managed by the DBMS 25 and has records corresponding to the number of the DB file systems. As shown in FIG. 5C, each record of the data area information table 60 includes a data area ID column 61 in which an identifier used by the DBMS 25 to identify the data area is registered, an area name column 62 in which the name of the data area is registered, a DB file system name column 63 in which the name of the DB file system is registered and an area size column 64 in which the area size of the DB file system is registered.

FIG. 5D is a schematic diagram showing an example of a DB file system information table 65 (corresponding to the DB file system information table 22 shown in FIG. 2) included in the DBMS servers 1, 2, . . . . The DB file system information table 65 is information used when the OS 24 of the DBMS servers 1, 2, . . . writes and reads data and includes records corresponding to the number of the data areas. As shown in FIG. 5D, each record of the DB file system information table 65 includes a DB file system name column 66 in which the name of the DB file system is registered, a logical unit number column 67 in which the logical unit number used by the OS 24 to access the storage apparatus 3, 4, . . . is registered and a storage address column 68 in which a name (for example, World Wide Name (WWN)) used by the OS 24 to identify the storage system 3, 4, . . . is registered.

FIG. 6A is a schematic diagram showing an example of a cost management table 70 (corresponding to the cost management table 20 shown in FIG. 2) included in the DBMS servers 1, 2, . . . . The cost management table 70 is cost information used when the DBMS 25 decides the type of the plan to access the DB based upon the cost. As shown in FIG. 6A, each record of the cost management table 70 includes a storage address column 71 in which the name (for example, WWN) used to identify the storage apparatus 3, 4, . . . in which the DBs are stored is registered, a logical unit number column 72 in which the logical unit number used by the DBMS 25 to access the storage apparatus 3, 4, . . . is registered, a current value I/O cost column 73 in which cost information used by the DBMS 25 to access the DB is registered, a cache I/O cost column 74 in which cost information used by the DBMS 25 to access data stored in the cache memory 39 of the storage apparatus 3, 4, . . . is registered and a disk I/O cost column 75 in which cost information used by the DBMS 25 to access the data stored in the physical disks 32, 33, 34, 35 of the storage apparatus 3, 4, . . . is registered.

The current value I/O cost column 73 includes a sequential column 76 in which an I/O cost of sequential access is registered and a random column 77 in which an I/O cost of random access is registered. The cache I/O cost column 74 includes a sequential column 78 in which an I/O cost of sequential access is registered and a random column 79 in which an I/O cost of random access is registered. The disk I/O cost column 75 includes a sequential column 80 in which an I/O cost of sequential access is registered and a random column 81 in which an I/O cost of random access is registered.

FIG. 6B is a schematic diagrams showing an example of a prefetch manager management table 82 (corresponding to the prefetch manager management table 21 shown in FIG. 2) included in the DBMS servers 1, 2, . . . . The prefetch manager management table 82 is a table showing the state information of the prefetch manager 45 required by the DBMS servers 1, 2, . . . to determine whether or not the prefetch manager 45 of the management server 5 is activated normally. As shown in FIG. 6B, each record of the prefetch manager management table 82 includes a management server address column 83 in which a management server address to operate the prefetch manager 45 is registered and a prefetch manager state column 84 in which the executed state of the prefetch manager 45 operable on the management server 5 registered on the management server address column 83 is registered.

FIG. 7A is a schematic diagram showing an example of a management server I/F management table 90 (corresponding to the management server I/F management table 46 shown in FIG. 4) included in the management server 5. As shown in FIG. 7A, each record of the management server I/F management table 90 includes an M-I/F column 91 in which connection I/F identifiers corresponding to the storage apparatus 3, 4, . . . and the DBMS servers 1, 2, . . . corresponding to the records, to be more concrete, information of the port ID of the connection I/F included in the management server 5 are registered and a name column 92 in which information of the name assigned to the connection I/F identifier registered on the M-I/F column 91 is registered.

FIG. 7B is a schematic diagram showing an example of a prefetch management table 93 (corresponding to the prefetch management table 47 shown in FIG. 4) included in the management server 5. As shown in FIG. 7B, each record of the prefetch management table 92 includes a storage address column 94 in which the names used by the prefetch manager 45 of the management server 5, which issues a prefetch command, to identify the storage apparatus 3, 4, . . . are registered, a logical unit number column 95 in which logical unit numbers used by the prefetch manager 45 of the management server 5 to access the storage apparatus 3, 4, . . . are registered, a logical block address column 96 in which header addresses of data are registered when the prefetch manager 45 of the management server 5 issues the prefetch command to the corresponding storage apparatus 3, 4, . . . , a data size column 97 in which the prefetch size data are stored and a state column 98 in which information used to identify whether or not the prefetch manager 45 of the management server 5 issues the prefetch command to the corresponding storage apparatus 3, 4, . . . is registered.

FIG. 8 is a schematic diagram showing an example of a storage I/F management table 100 (corresponding to the storage I/F management table 38 shown in FIG. 3) included in the storage apparatus 3, 4, . . . As shown in FIG. 8, each record of the storage I/F management table 100 includes an S-I/F column 101 in which connection I/F identifiers to the DBMS servers 1, 2, . . . corresponding to the records and the management server 5 are registered and a name column 102 in which information of the names assigned to the connection I/F identifiers registered on the S-I/F column 101 are registered.

FIG. 9A is a schematic diagram showing an example of an arrangement of DB access information used by the DBMS 25 to access the DB and an example of DB access information.

As shown in FIG. 9A, the DB access information 110 includes a DBMS-ID column 111 in which DBMS identifiers operable in the DBMS servers 1, 2, . . . are registered, a query ID column 112 in which identifiers for identifying the queries which are inquiries to be executed are registered, a scan identification column 113 in which information for identifying scans to be executed within the query are registered, a storage address column 114 in which the names for identifying the storage apparatus 3, 4, . . . in which the DBs are stored are registered, a logical unit number column 115 in which the numbers for identifying the logical units in which data are stored are registered, a header logical block address column 116 in which information indicating the header address for accessing data are registered and a data size column 117 in which the sizes of accessed data are registered.

FIG. 9B is a schematic diagram showing an example of prefetch command information 118 used by the management server 5 to transmit a prefetch command to the storage apparatus 3, 4, . . . . As shown in FIG. 9B, the prefetch command information 118 includes a storage address column 119 in which storage names for identifying the storage apparatus 3, 4, . . . for commanding the prefetch are registered, a logical unit number column 120 in which the numbers for identifying the logical units in which data are stored are registered, a logical block address column 121 in which header address information of data to command the prefetch are registered and a data size column 122 in which the data size of data to command the prefetch is registered.

Operations of the embodiment according to the present invention will be described next with reference to FIGS. 10A and 10B.

Figure 10A:
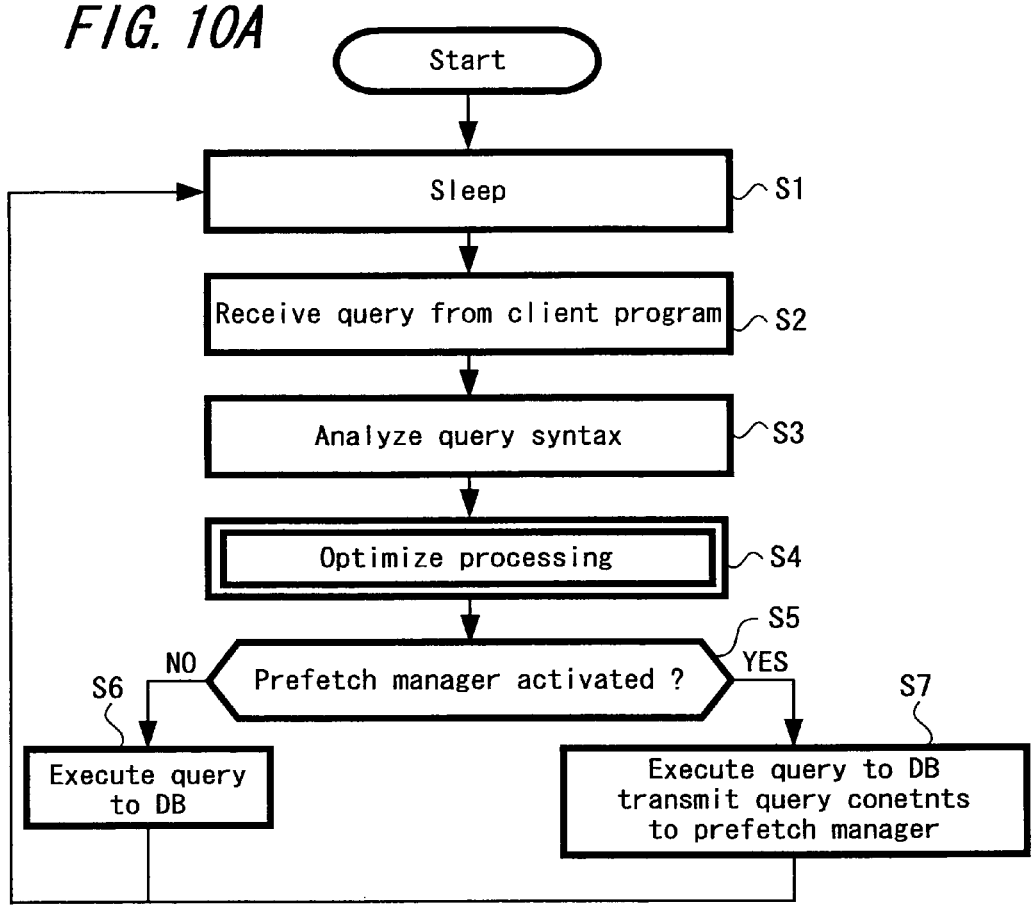
FIGS. 10A and 10B are flowcharts showing examples of processing in which the DBMS server receives a query request from a client and the DBMS server executes the query to the client, respectively.

FIG. 10A is a flowchart showing an example of a processing procedure in which the plan creation manager 26 of the DBMS servers 1, 2, . . . receive the query from the client program 23, decides an access plan to access the DBs stored in the storage apparatus 3, 4, . . . and accesses the storage apparatus 3, 4, . . . .

The plan creation manager 26 is activated at the same time the DBMS 25 is activated and executes the following processing flowchart. Also, the plan creation manager 26 ends the processing at the same time the DBMS 25 is ended.

Referring to FIG. 10A, and following the start of operation, in order to search the party being communicated, the plan creation manager 26 of the DBMS servers 1, 2, . . . is temporarily placed in the sleep mode after it was activated and awaits the arrival of the query which is the access request from the client program 23 at a step S1. After that, the plan creation manager 26 receives the query, which is the access request to the DB, from the client program 23 at a step S2.

The plan creation manager 26 of the DBMS servers 1, 2, . . . analyzes the DB access request query syntax from the client program 23 at a step S3 and then the plan creation manager 26 executes the optimizing processing of the access plan at a step S4. Specifically, the plan creation manager 26 creates the plan from the query syntax, calculates a cost with reference to the I/O cost registered on the current value I/O cost column 73 of the cost management table 70 and executes the execution plan. The access plan optimizing processing at the step. S4 will be described in detail with reference to a flowchart of cost optimizing processing shown in FIG. 11A later on.

After the plan creation manager 26 decided the access plan as described above, the plan creation manager 26 executes the query to the DBs stored in the storage apparatus 3, 4, . . . and executes the access plan notification processing to the prefetch manager 45 of the management server 5 as follows.

Then, it is determined at a decision step S5 by the plan creation manager 26 of the DBMS servers 1, 2, . . . whether or not the prefetch manager 45 of the management server 5 is activated. To be more concrete, it is determined at the decision step S5 by the plan creation manager 26 of the DBMS servers 1, 2, . . . whether or not the state of the prefetch manager 45 registered on the prefetch manager state column 84 of the corresponding management server registered on the management server address column 83 of the prefetch manager management table 82 is "ALIVE". If the state of the prefetch manager state column 84 is "ALIVE" as represented by a YES at the decision step S5, then the plan creation manager 26 determines that the prefetch manager 45 of the management server 5 is operated normally, and control goes to the next step S7. If the state of the prefetch manager state column 84 is not "ALIVE" as represented by a NO at the decision step S5, the plan creation manager 26 determines that the prefetch manager 45 of the management server 5 is stopped, and control goes to the next step S6.

If it is determined by the plan creation manager 26 at the decision step S5 that the prefetch manager 45 is stopped, then control goes to the step S6, whereat the plan creation manager 26 effects the ordinary query processing on the storage apparatus 3, 4 . . . in which data are stored with reference to the DB file system information table 65 and the DB schema information table 53. Then, control goes back to the step S1.

Then, if it is determined by the plan creation manager 26 at the decision step S5 that the prefetch manager 45 is operated normally, then control goes to the next step S7, whereat the plan creation manager 26 effects the prefetch query processing on the storage apparatus 3, 4, . . . similarly to the step S6 and notifies the DB access information to the management server 5 at the same time.

Figure 10B:
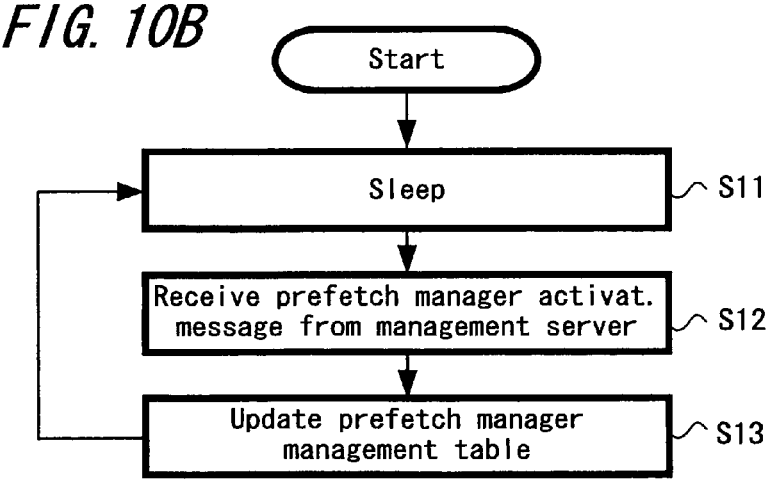

FIG. 10B is the flowchart showing an example of the activation message receiving processing procedure in which the plan creation manager 26 of the DBMS servers 1, 2, . . . receives the activation message from the prefetch manager 45 of the management server 5.

The plan creation manager 26 is activated at the same time the DBMS 25 is activated and executes the following processing. Also, at the same time the DBMS 25 is ended, the plan creation manager 26 is ended.

First, in the activation message receiving processing, referring to FIG. 10B, and following the start of operation, at a step S11, after the plan creation manager 26 was activated, the plan creation manager 26 is placed in the sleep mode and awaits the arrival of the activation message from the prefetch manager 45 of the management server 5. Then, control goes to the next step S12, whereat the plan creation manager 26 receives the activation message from the prefetch manager 45. Then, control goes to the next step S13, whereat the plan creation manager 26 updates the prefetch manager state column 84 of the corresponding management server address of the prefetch manager management table 82.

Figures 11A, 11B:
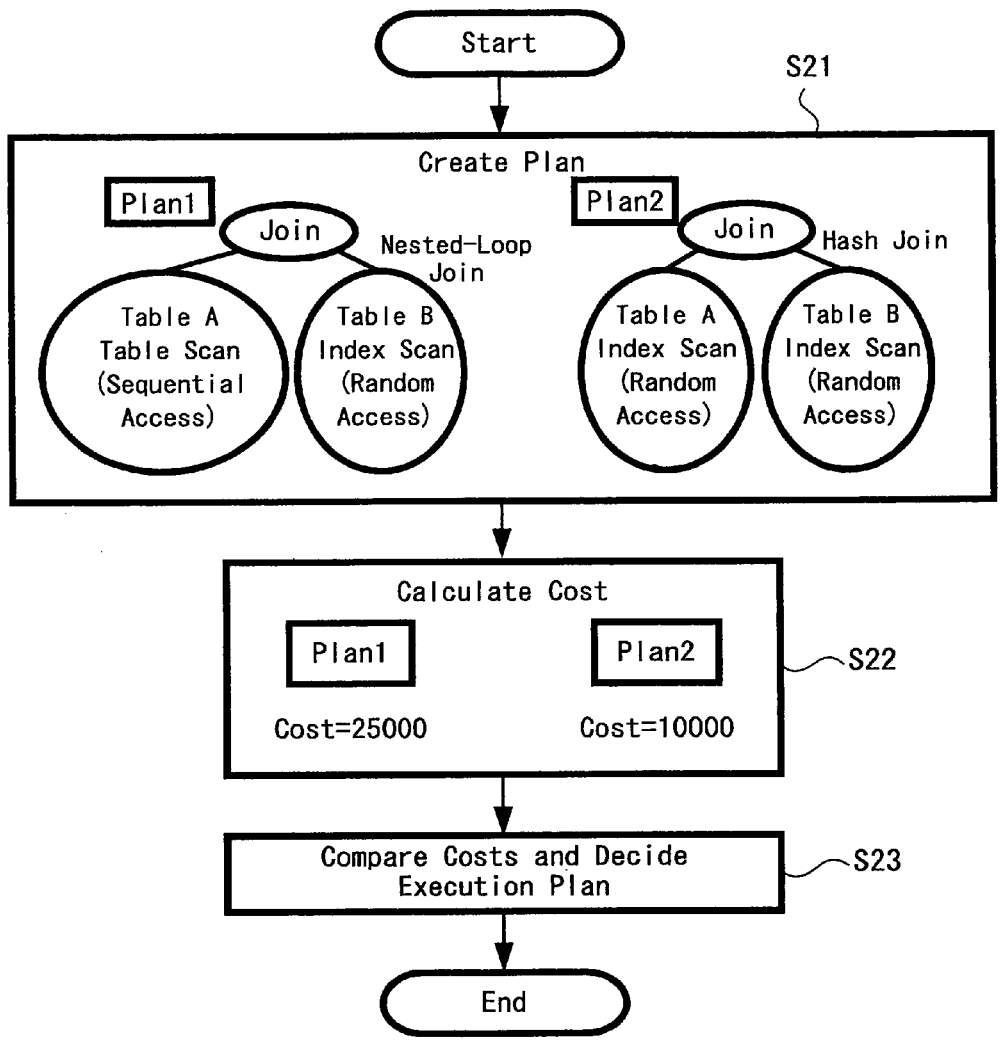
FIGS. 11A and 11B are flowcharts showing examples of optimum processing in which the DBMS server can decide an execution plan, respectively.

FIG. 11A is a flowchart showing an example of a processing procedure in which the plan creation manager 26, shown in FIG. 2, of the DBMS servers 1, 2, . . . , receive the query from the client program 23 and optimizes the access plan.

The plan creation manager 26 generates the access plan from the query syntax analyzed result from the client program 23 processed at the step S3 shown in FIG. 10A and determines the access plan by calculating the cost and by comparing the costs.

In the flowchart of the present processing, let us consider a query 130 shown in FIG. 11B by way of example.

In the query 130 shown in FIG. 11B, a table T1 and a table T2 are coupled. As a method for coupling the tables T1 and T2, there are known methods such as Nested-Loop Join, Sort-Merge Join and Hash Join. In the example shown in FIG. 11A, there are shown a plan 1 in which the tables T1 and T2 are coupled by Nested-Loop Join (Nested-Loop Join coupling using the table T1 as an inner table) and a plan 2 in which the tables T1 and T2 are coupled by Hash Join, by way of example.

Referring to FIG. 11A, and following the start of operation, when the plan creation manager 26 executes the optimizing processing at the step S4 of FIG. 10A, control goes to a step S21, whereat the plan creation manager 26 creates the access plan from the syntax analyzed result obtained from the client program 23 processed at the step S3 shown in FIG. 10A. In the Nested-Loop Join coupling of the plan 1, for example, a table A sequentially accessed by table scan and a table B randomly accessed by index scan are coupled by Nested-Loop Join. In the Hash Join coupling, a table A randomly accessed by index scan and a table B randomly accessed by index scan are coupled by Hash Join. By the coupling methods of the Nested-Loop Join coupling of the plan 1 and the Hash Join coupling of the plan 2 and combinations of the accesses of the sequential access and the random access, various kinds of costs are calculated and the costs of respective plans are calculated. To be more concrete, at a step S22, costs are calculated by using the I/O cost registered on the cost management table 20. Then, control goes to a step S23, whereat the access plan, which is the lowest cost obtained from the cost calculated result calculated at the step S22, is decided as the access plan that is to be executed by the DBMS 25. After the plan creation manager 26 has finished the processing of the step S23, the plan creation manager 26 ends the optimizing processing.

Figure 12:
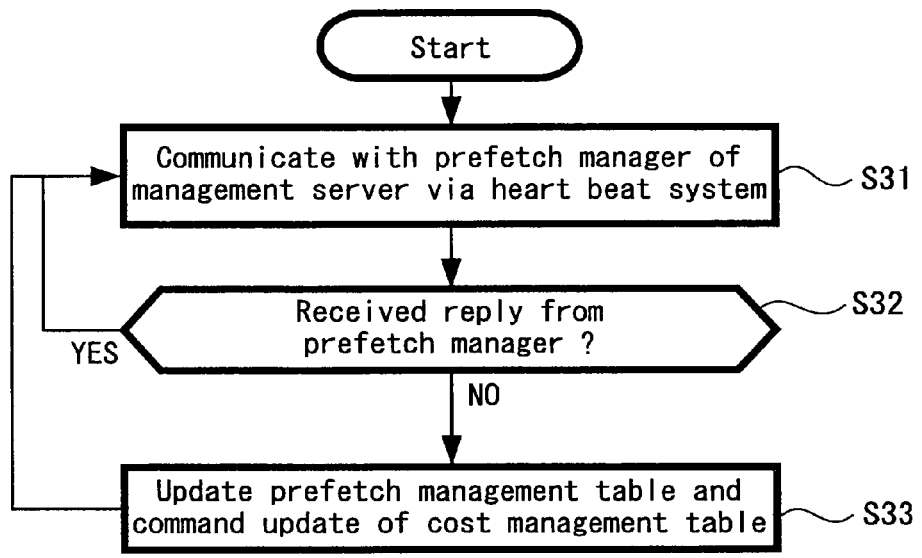
FIG. 12 is a flowchart showing an example of processing in which it is determined by a plan creation manager whether or not a prefetch manager of a management server is operated normally.

FIG. 12 is a flowchart showing an example of a processing procedure in which it is determined by the DBMS servers 1, 2, . . . whether or not the prefetch manager 45 of the management server 5 is operated normally.

Referring to FIG. 12, and following the start of operation, the plan creation manager 26 activates a program to determine whether or not the prefetch manager 45 of the management server 5 is operated normally. Then, control goes to a step S31, whereat the plan creation manager 26 communicates with the prefetch manager 45 of the management server 5 registered on the prefetch manager management table 82 at constant interval by a suitable system such as a heart-beat system. Then, control goes to the next decision step S32, whereat it is determined whether or not the prefetch manager 45 of the management server 5 responds to the transmitted data. If the prefetch manager 45 of the management server 5 responds to the data transmitted at the step S31 as represented by a YES at the decision step S32, it is determined by the plan creation manager 26 that the prefetch manager 45 is operated normally, and control goes back to the step S31. If on the other hand the prefetch manager 45 of the management server 5 does not respond to the data transmitted at the step S31 as represented by a NO at the decision step S32, then it is determined by the plan creation manger 26 that the prefetch manager 45 is halted, and control goes to a step S33.

If it is determined at the decision step S32 that the prefetch manager 45 does not respond to the data transmitted at the step S31, that is, it is determined by the plan creation manager 26 that the prefetch manager 45 is halted, then control goes to the step S33, whereat the prefetch manager state column 84 of the prefetch manager management table 82 is changed to "Halt". Also, it is determined by the plan creation manager 26 that the prefetch manager 45 of the management server 5 is halted and that accessed data is not registered on the cache memory 39 of the storage system apparatus 3, 4, . . . . Then, the plan creation manager 26 issues a command to the cost management manager 27 of the DBMS servers 1, 2, . . . such that the value of the I/O cost column is changed to a value of the disk access I/O column. Then, control goes back to the step S31.

Figure 13:
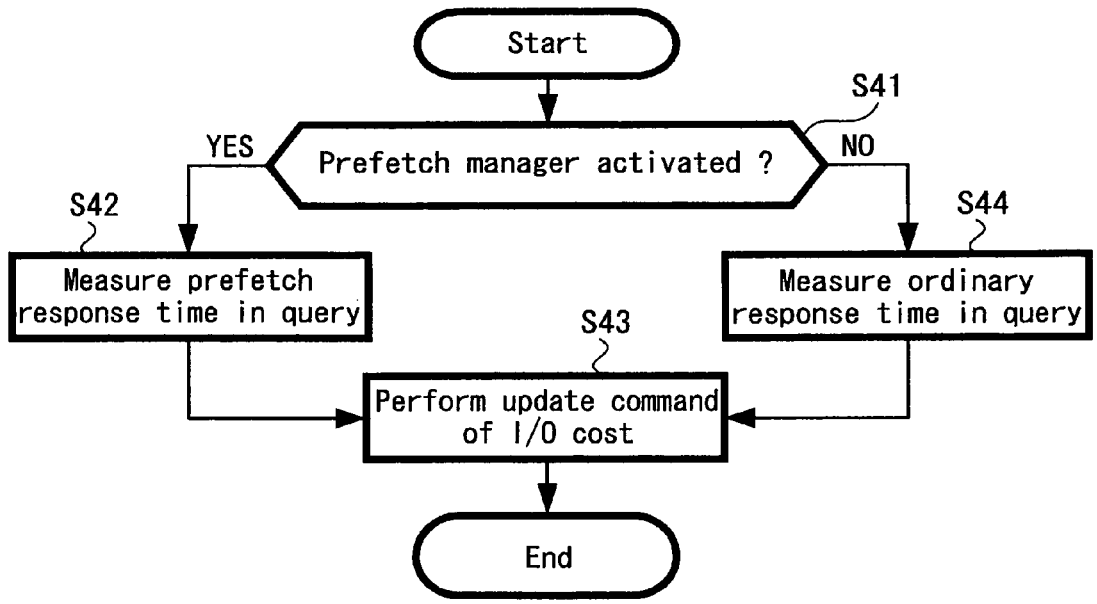
FIG. 13 is a flowchart showing an example of processing in which the plan creation manager can confirm an I/O cost.

FIG. 13 is a flowchart showing an example of a processing procedure in which the plan creation manager 26 of the DBMS servers 1, 2, . . . calculates the I/O cost. This processing is executed by the plan creation manager 26 of the DBMS servers 1, 2, . . . when any one of the current value I/O cost column 73, the cache I/O cost column 74 and the disk I/O cost column 75 of the cost management table 70 is not registered.

Referring to FIG. 13, and following the start of operation, first, the plan creation manager 26 activates the program for calculating the I/O cost. Then, control goes to the next decision step S41, whereat it is determined by the plan creation manager 26 whether or not the prefetch manager 45 of the management server 5 is activated. More specifically, it is determined by the plan creation manager 26 based upon the prefetch manager state column 84 of the prefetch manager management table 82 whether or not the prefetch manager 45 of the management server 5 is "ALIVE" (the prefetch manager 45 is operated normally). If the prefetch manager 45 of the management server 5 is operated normally as represented by a YES at the decision step S41, then control goes to a step S42, whereat the plan creation manager 26 measures the prefetch access I/O time at the step S7 shown in FIG. 10A whereat the DBMS 25 issues the query to the storage apparatus 3, 4 . . . .

If on the other hand the prefetch manager 45 is not operated normally (that is, halted) as represented by a NO at the decision step S41, then control goes to a step S44, whereat the plan creation manager 26 measures the normal access I/O time at the step S6 shown in FIG. 10A whereat the DBMS 25 issues the query to the storage apparatus 3, 4 . . . . Then, control goes to a step S43, whereat the measured prefetch access or normal access I/O time is converted into cost information by using parameters and the plan creation manager 26 issues the I/O cost change command to the cost management manager 5 of the DBMS servers 1, 2, . . . and, control is ended.

Figure 14:
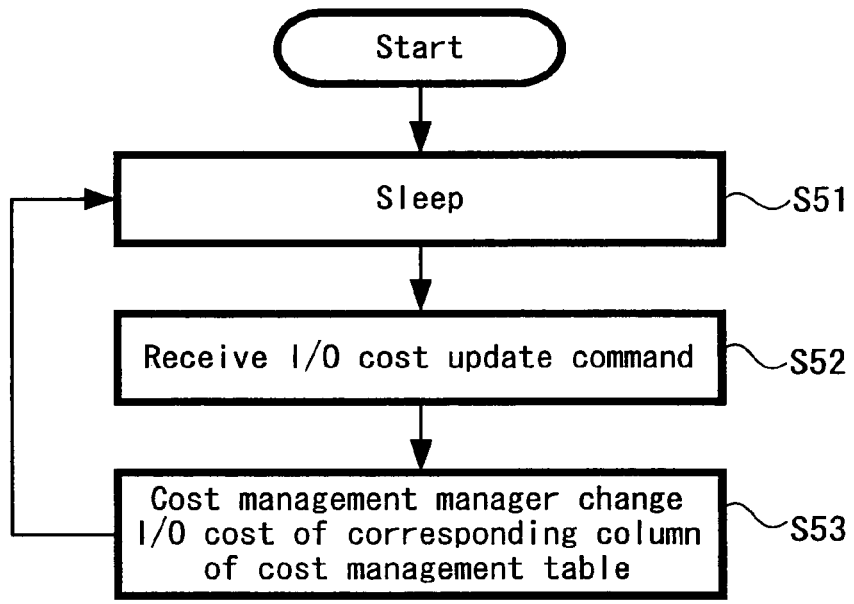
FIG. 14 is a flowchart showing an example of processing in which the cost management manager can operate a cost management table.

FIG. 14 is a flowchart showing an example of a processing procedure in which the cost management manager 27 of the DBMS servers 1, 2, . . . updates the cost management table 20.

The cost management manager 27 is activated at the same time the DBMS 25 is activated and executes the following processing. Also, at the same time the DBMS 25 is ended, the cost management manager 27 ends the processing.

Referring to FIG. 14, and following the start of operation, the cost management manager 27 activates the program for updating the cost management table 20. Then, control goes to a step S51, whereat the cost management manager 27 activates the program for updating the cost management table 20 and places this program in the sleep mode and awaits the arrival of the access I/O cost update command to the DB from the plan creation manager 26. Then, control goes to a step S52, whereat the cost management manager 27 receives the access I/O cost update command to the DB from the plan creation manager 26. Then, control goes to a step S53, whereat the cost management manager 27 updates the cost information of the corresponding column of the cost management table 20, and control goes back to the step S51. The I/O cost update command may be received not only by the cost management manager 27 but also by the prefetch manager 45 of the management server 5.

Figure 15:
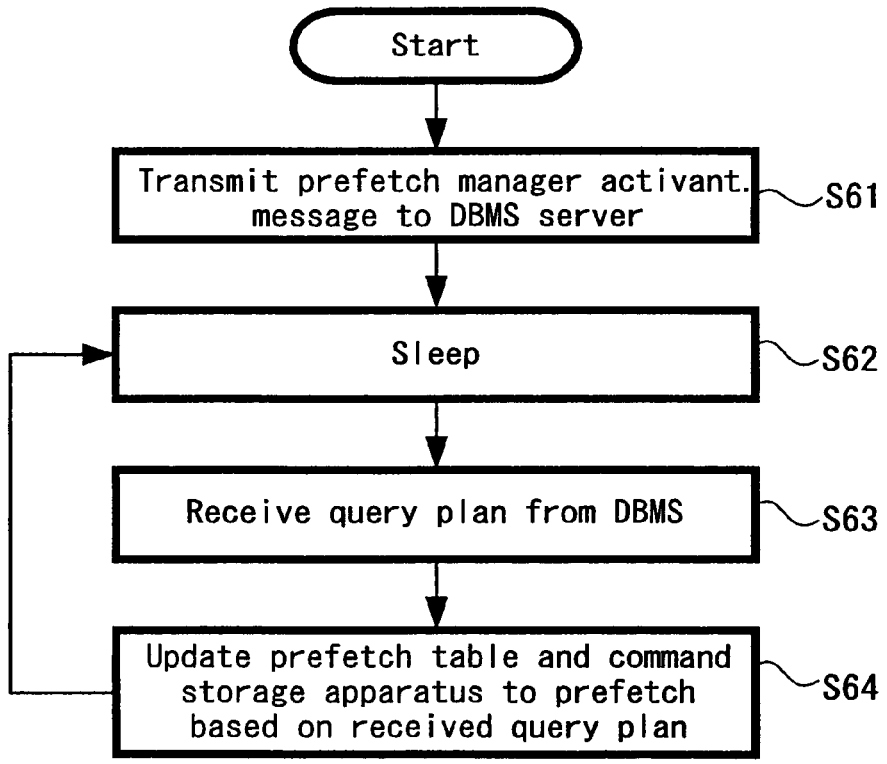
FIG. 15 is a flowchart showing an example of processing in which a prefetch manager can transmit a prefetch command to the storage apparatus.

FIG. 15 is a flowchart showing an example of a processing procedure in which the prefetch manager 45 of the management server 5 receives the access plan from the DBMS servers 1, 2, . . . and issues the prefetch command to the storage apparatus 3, 4, . . . . The prefetch manager 45 executes the following processing flowchart after it was activated.

Referring to FIG. 15, and following the start of operation, first, the prefetch manager 45 of the management server 5 activates the prefetch command program. Then, control goes to a step S61, whereat the prefetch manager 45 transmits an activation message, which indicates that the prefetch manager 45 was activated, to the DBMS servers 1, 2, . . . . Then, control goes to a step S62, whereat the prefetch command program of the prefetch manager 45 is activated and is placed in the sleep mode, whereafter the prefetch manager 45 awaits the arrival of the access plan from the DBMS servers 1, 2, . . . . Then, control goes to a step S63, whereat the prefetch manager 45 receives the access plan from the DBMS servers 1, 2, . . . . Then, control goes to a step S64, whereat the prefetch manager 45 updates the prefetch management table 93 based upon the access plan information received at the step S63 and issues the prefetch command to the storage apparatus 3, 4 . . . based upon the thus received access plan information.

At that time, the type of data for issuing the prefetch command to the storage apparatus 3, 4, . . . is such one shown in FIG. 9B. Header information is added to the data 118 shown in FIG. 9B and the prefetch command data is transmitted to the storage apparatus 3, 4 . . . .

While the management server 5 makes communication by using the storage apparatus 3, 4, . . . and the communication path 10 such as the LAN as in the above-mentioned embodiment, the present invention is not limited thereto and the management server 5 may use the communication lines 6, 8 such as the FC which is the path used when the DBMS 25 accesses the DBMS servers 1, 2, . . . and the storage apparatus 3, 4 . . . .

Also, such a variation may be possible, in which the storage apparatus 3, 4, . . . may respond to the prefetch command depending on the kind of the header information at the step S64.

Figures 16, 17:
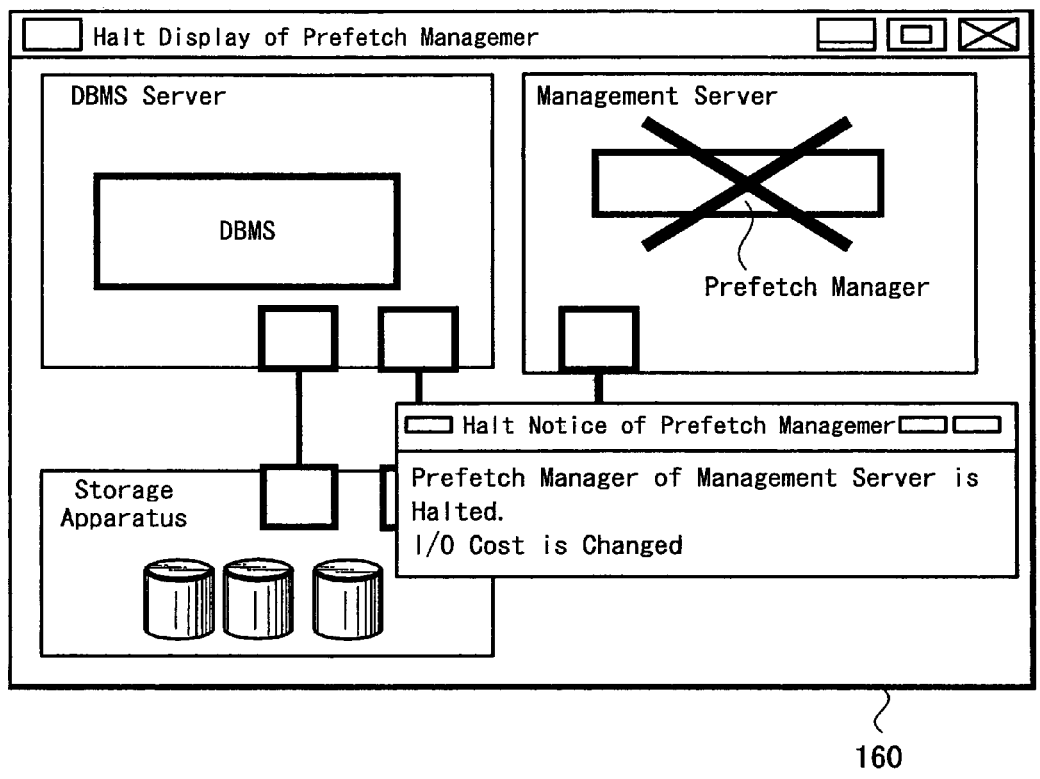
FIG. 16 is a schematic diagram showing an example of contents of a picture displayed when the prefetch manager is halted and the plan is changed by the DBMS server.
FIG. 17 is a schematic diagram showing an example of an arrangement of a response time designation information table included in the management server.

According to the embodiment of the present invention, when the prefetch manager 45 of the management server 5 is halted in processing due to any reason, the plan prefetch manager 27 of the DBMS servers 1, 2, . . . understands that the prefetch manager 45 of the management server 5 is halted, receives the query from the client program and optimizes the access cost so that it becomes possible to select a more suitable execution access plan. FIG. 16 shows an example of a displayed picture representing that the plan creation manager 26 of the DBMS servers 1, 2, . . . notifies the system administrator of the above-described access plan change processing.

Another embodiment of the present invention will be described below. This embodiment describes operations of the management server if a plurality of DBMS servers issue a plurality of access requests when there is provided a plurality of DBMS servers.

In this embodiment, a response time required until the storage apparatus 3, 4, . . . receives the completion of the reply after the prefetch manager 45 of the management server 5 has transmitted the prefetch command to the storage apparatus 3, 4, . . . is calculated, the situation of the storage apparatus 3, 4, . . . is understood from the calculated information and the I/O cost change command is issued to the DBMS servers 1, 2, . . . .

FIG. 17 is a diagram showing an example of response time designating information which is designated to the management server 5 by the system administrator. A response time designate information 170 is information that is used to determine whether a response time becomes longer (shorter) than a time designated by present information when the prefetch manager 45 of the management server 5 transmits the prefetch command to the storage apparatus 3, 4, . . . . As shown in FIG. 17, the response time designate information 170 includes a response time (delay) column 171, a response time (recovery) column 172 and a delay cost column 173.

As shown in FIG. 17, the delay cost column 173 includes a sequential column 174 and a random column 175. Information registered on the response time (delay) column 171 is information for transmitting the I/O cost change command, registered on the delay column 173, to the cost management manager 27 of the DBMS servers 1, 2, . . . if it is determined by comparing the response time with the response time required until the storage apparatus 3, 4, . . . receive the reply of the end of the prefetch after the management server 5 has transmitted the prefetch command to the storage apparatus 3, 4, . . . that the response time of the compared result becomes longer than the value on the response time (delay) column 171. Information registered on the response time (recovery) column 172 is information for determining whether or not the I/O cost change command should be transmitted to the cost management manager 27 of the DBMS servers 1, 2, . . . if it is determined by comparing the response time with the response time required until the storage apparatus 3, 4, . . . receive the reply of the end of the prefetch after the management server 5 has transmitted the prefetch command to the storage apparatus 3, 4, . . . that the response time of the compared result becomes longer than the value on the response time (recovery) column 172. This response time information is registered by the system administrator.

Figure 18:
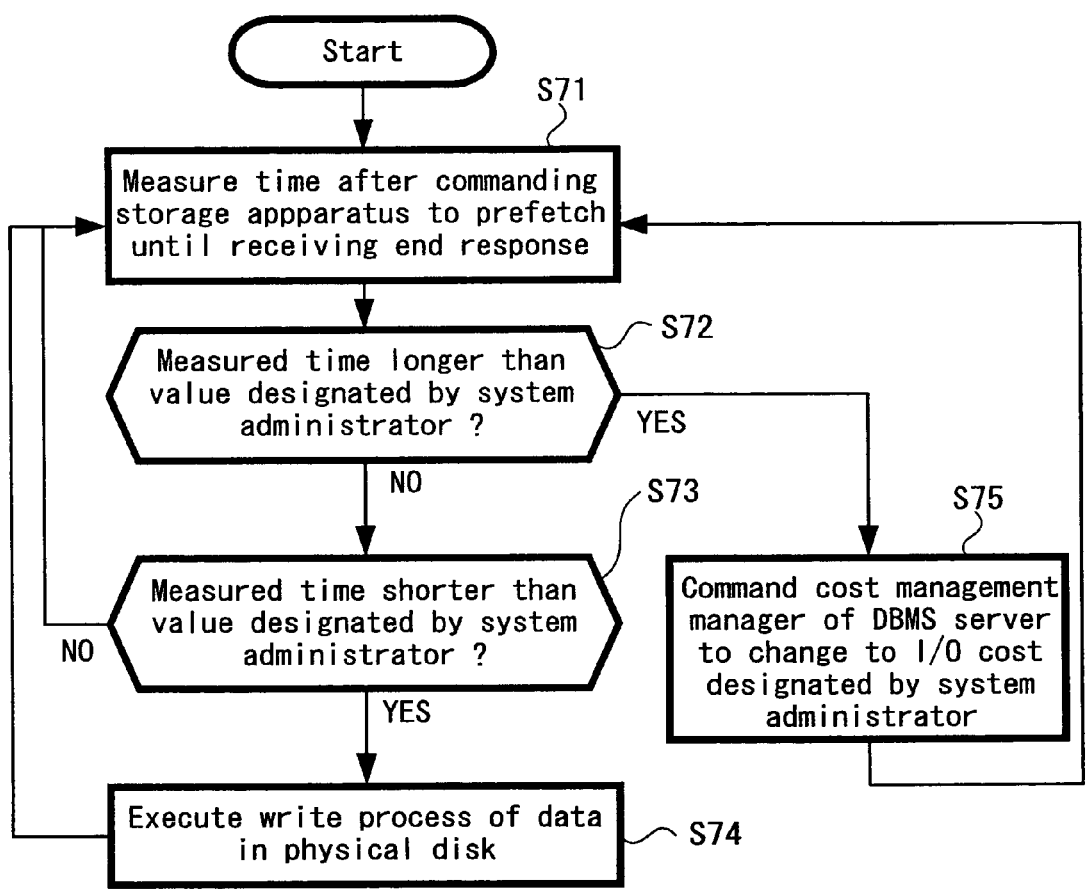
FIG. 18 is a flowchart showing an example of processing in which the prefetch manager understands the I/O cost of the storage apparatus and it transmits the I/O cost change command to the DBMS server during the prefetch processing.

FIG. 18 is a flowchart showing an example of a processing procedure in which the prefetch manager 45 of the management server 5 calculates the response time to transmit the prefetch command to the storage apparatus 3, 4, . . . , estimates the state of the storage apparatus 3, 4, . . . from the response time and transmits the I/O cost change command to the cost management manager 27 of the DBMS servers 1, 2, . . . . The prefetch manager 45 executes the following processing flowchart after it was activated.

Referring to FIG. 18, and following the start of operation, first, control goes to a step S71, whereat the prefetch manager 45 calculates a time required until it receives the response of the end of the prefetch from the storage apparatus 3, 4, . . . after it has transmitted the prefetch command to the storage apparatus 3, 4, . . . . Then, control goes to the next decision step S72, whereat it is determined by the prefetch manager 45 whether the response time measured at the step S71 becomes longer than a time registered on the response time (delay) column 171 of the response time designated information 170. If the above response time is longer than the time registered on the response time (delay) column 171 of the response time designate information 170 as represented by a YES at the decision step S72, then control goes to a step S75. If on the other hand the above response time is shorter than the time registered on the response time (delay) column 171 of the response time designate information 170 as represented by a NO at the decision step S72, then control goes to a step S73.

If it is determined at the decision step S72 that the calculated response time is shorter than the time registered on the response time (delay) column 171 of the response time designate information 170, then control goes to the next decision step S73. At the decision step S73, it is determined by the prefetch manager 45 whether or not the response time measured at the step S71 is shorter than the time registered on the response time (recovery) column 172 of the response time designate information 170. If the above response time is longer than the time registered on the response time (recovery) column 172 of the response time designate information 170 as represented by a NO at the decision step S73, then control goes back to the step S71. If on the other hand the above response time becomes shorter than the time registered on the response time (recovery) column 172 of the response time designate information 170 as represented by a YES at the decision step S73, then control goes to a step S74.

Then, if it is determined at the decision step S73 that the calculated response time falls within the time registered on the response time (recovery) column 172 of the response time designate information 170, then control goes to the step S74, whereat the prefetch manager 45 notifies the cost management manager 27 of the DBMS servers 1, 2, . . . of the response time calculated at the step S71 and transmits the change command to change the value registered on the current value column 73 of the cost management table 70. Then, control goes back to the step S71.

If it is determined at the decision step S72 that the response time measured at the step S71 is longer than the time registered on the response time (delay) column 171 of the response time designate information 170, then control goes to the step S75, whereat the prefetch manager 45 transmits the command to the cost management manager 27 of the DBMS servers 1, 2, . . . such that the cost on the current value column 73 of the cost management table 70 should be changed to the cost registered on the delay cost column 173 of the response time designate information 170. Then, control goes back to the step S71.

According to this embodiment, when the prefetch request from the management server 5 or the access request from the DBMS servers 1, 2, . . . is increased, the state of the storage apparatus 3, 4, . . . is understood by the response time required until the prefetch manager 45 receives the response of the end of the prefetch from the storage apparatus 3, 4, . . . after the prefetch manager 45 has transmitted the prefetch command to the storage apparatus 3, 4, . . . , whereby the DBMS 25 of the DBMS servers 1, 2, . . . can access the DB by using the proper I/O in response to the loads of the storage apparatus 3, 4 . . . .

According to the present invention, there is provided a server system for accessing database after having carried out optimizing processing based upon a database management program in response to a request from a client. This server system is comprised of one or a plurality of first servers in which the database management program is operated, one or a plurality of second servers in which a prefetch program for commanding prefetch of data stored in the database management program is operated, a control unit having a cache memory for prefetching the data, one or a plurality of physical disk devices for storing database operated by the database management program and one or a plurality of storage systems connected to the first and second servers, wherein the first server includes a prefetch plan creating unit for creating an execution plan to allow confirmation information to confirm that the first and second servers are operated normally is transmitted and received between the first and second servers and the database management program accesses the database and a prefetch plan change unit for changing an execution plan to allow the first server to determine that the second server is halted if the second server is halted and in which the database management program accesses the database.

Further, according to the present invention, there is provided a server which is comprised of an interface unit connected to a storage system so as to communicate with the storage system, the storage system including one or a plurality of first servers in which a database management program for accessing database after having carried out optimizing processing in response to a request from a client is operated, a second server in which a prefetch program for commanding prefetch of data stored in the database based upon information to access the database is operated, a control unit having a cache memory to prefetch the data and one or a plurality of physical disk devices for storing database operated by the database management program, a prefetch plan transmitting unit for receiving activation information transmitted after the prefetch program of the server was activated, obtaining an execution plan to allow the database management program to access the database stored in the storage system and transmitting the execution plan to the second server, a prefetch plan creating unit for creating the execution plan to allow the database management program to access the database by transmitting and receiving confirmation information for confirming whether or not the second server is operated normally between it and the seconds server and a prefetch plan changing unit for understanding based upon the confirmation information that the second server is halted and changing the execution plan to allow the database management program to access the database.

Further, according to the present invention, there is provided a database access method for accessing database by executing optimizing processing based upon a database program in response to a request from a client. This database access method is comprised of the steps of operating the database management program in one or a plurality of servers, operating a prefetch program for commanding prefetch of data stored in the database in one or a plurality of second servers when the database management program is operated in the one or the plurality of servers, receiving by the first server activation information in which the activation information of the prefetch program is transmitted to the first server after the prefetch program of the second server was activated, transmitting an execution plan to allow the database management program to access the database to the second server, transmitting a fetch command from one or a plurality of physical disk devices for storing database operated by the database management program to a cache memory in one or a plurality of storage systems connected to the first and second servers; transmitting and receiving confirmation information between the first server and the second server in order to confirm that the first and second servers are operated normally and understanding that the second server is halted if the second server is halted and changing an execution plan in which the database management program accesses the database.

Furthermore, according to the present invention, there is provided a database for accessing database by executing optimizing processing based upon a database management program in response to a request from a client, including a server in which the database management program is operated, a storage for storing therein database operated by the database management program, a prefetch program provided on paths of the server and the storage or a path between the server and the storage to transmit a prefetch command of data stored in the database. This database system is comprised of a prefetch plan transmitting unit for receiving activation information to transmit the activation information of the prefetch program to the database management program after the prefetch program was activated and transmitting an execution plan to allow the database management program to access the database to the prefetch program, a prefetch commanding unit for commanding the prefetch program to prefetch data from one or a plurality of physical disk devices to a cache memory in the storage based upon the database management program, a prefetch plan creating unit for creating an execution plan to allow the database management program to access the data by transmitting and receiving confirmation information between the database management program and the prefetch program in order to confirm that the database management program and the prefetch program are operated normally and a prefetch plan changing unit for changing an execution plan to allow the database management program to access the database when the database management program understands that the prefetch program is halted if the prefetch program is halted.

According to the present invention, since it can be determined by the DBMS whether or not data accessed by the DBMS is registered on the cache memory of the storage apparatus, the DBMS can generate the access plan at the proper I/O cost.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A computer system comprising:
   a storage system having a plurality of physical disk devices for storing data of a database and a control unit in data communication with a cache memory for prefetching data;
   a plurality of first computers coupled to the storage system and configured to access the database; and
   a second computer coupled to the first computer and the storage system and configured to execute a prefetch operation of some of the data of the database;
   wherein each of the first computers is further configured to:
   monitor a status of the prefetch operation for the second computer,
   measure a prefetch access time if the status is monitored as normal,
   measure a normal access time including the time to access data from the cache memory or the time to access data from the physical disk devices if the status is monitored as abnormal,
   store a cost management table which stores I/O cost information of each of logical volumes in the storage system, the I/O cost information is a value which results from converting the prefetch access time and the normal access time,
   receive, from a client computer, a query for accessing the database,
   generate an access plan related to the database on the basis of the query and the cost management table,
   access the database according to the generated access plan if the status is monitored as abnormal, and
   send the generated access plan to the second computer for prefetching if the status is monitored as normal,
   wherein the second computer is further configured to:
   measure a response time which is time from sending a prefetch command to the storage system to receiving a completion response of the prefetch command from the storage system,
   store a response time management table indicating a first threshold time and a second threshold time, which is less than the first threshold time, and
   manage change of the I/O cost information in the cost management table stored in each of the first computers if the response time is greater than the first threshold time, then manage change of the I/O cost information if the response time is less than the second threshold time.

2. The computer system according to claim 1, wherein the second computer includes a memory temporarily storing the generated access plan to access the database received from each of the first computers.

3. The computer system according to claim 1, wherein the second computer obtains information related to load situation of the storage system from a start time of a prefetch command to the storage system to the end of the prefetch command.

4. The computer system according to claim 1, wherein the second computer transmits cost information in the load situation to each of the first computers for updating the cost management table.

5. The computer system according to claim 1 wherein each of the first computers further generates a plurality of access plans in response to the query for accessing, whereby one of the access plans is chosen as the generated access plan.

6. A first computer comprising:
an interface coupled to a storage system for storing a database, the storage system comprising a control unit having a cache memory to store prefetched data from the database and one or more physical disk devices for storing the database; and
a processor coupled to the interface,
the interface in data communication with a second computer configured for performing a prefetch operation of data stored in the database,
wherein the processor is configured to:
monitor a status of the prefetch operation for the second computer,
measure a prefetch access time if the status is monitored as normal,
measure normal access time including the time to access data from the cache memory or the time to access data from the physical disk devices if the status is monitored as abnormal,
store a cost management table which stores I/O cost information of each logical volume in the storage system, the I/O cost information is a value which results from converting the prefetch access time and the normal access time,
receives, from a client computer, a query for accessing the database,
generate an access plans related to the database on the basis of the query and the cost management table,
access the database with referring to the generated access plan, and
send the access plan to the second computer for prefetching if the status is monitored as normal,
wherein the second computer is further configured to:
measure a response time which is time from sending a prefetch command to the storage system to receiving a completion response of the prefetch command from the storage system,
store a response time management table indicating a first threshold time and a second threshold time, which is less than the first threshold time, and
manage change of the I/O cost information in the cost management table stored in each of the first computers if the response time is greater than the first threshold time, then manage change of the I/O cost information if the response time is less than the second threshold time.

7. In a computer system having a storage system that includes plurality of physical disk devices for storing data of a database, and a control unit that includes a cache memory for storing prefetched data, wherein a plurality of first computers is coupled to the storage system and accesses the database, wherein a second computer is coupled to each of the first computers and the storage system and is configured to execute prefetches of the data stored in the database, a method for managing the database comprising steps of:
monitoring a status of operation for the second computer;
measuring a prefetch access time if the status is monitored as normal;
measuring a normal access time including the time to access data from the cache memory or the time to access data from the physical disk devices if the status is monitored as abnormal;
storing a cost management table which stores I/O cost information of each logical volume in the storage system, the I/O cost information is a value which results from converting the prefetch access time and the normal access time;
receiving, from a client computer, a query for accessing the database;
generating an access plans related to the database on the basis of the query and the cost management table;
accessing the database with referring the access plan if the status is monitored as abnormal;
a sending the access plan to the second computer for prefetching if the status is monitored as normal;
measuring via the second computer a response time which is time from sending a prefetch command to the storage system to receiving a completion response of the prefetch command from the storage system;
storing via the second computer a response time management table indicating a first threshold time and a second threshold time, which is less than the first threshold time; and
managing via the second computer change of the I/O cost information in the cost management table stored in each of the first computers if the response time is greater than the first threshold time, then manage change of the I/O cost information if the response time is less than the second threshold time.

* * * * *